(12) United States Patent
Brown et al.

(10) Patent No.: US 11,619,331 B2
(45) Date of Patent: *Apr. 4, 2023

(54) GASKET HAVING INTERLOCKED INNER DIAMETER SEAL ELEMENT

(71) Applicant: Garlock Pipeline Technologies, Inc., Palmyra, NY (US)

(72) Inventors: Ian Brown, Denver, CO (US); Ryan M. Buttimer, Ann Arbor, MI (US); T. Scott Tanner, Rochester, NY (US); Christopher Remley, Athens, AL (US)

(73) Assignee: Garlock Pipeline Technologies, Inc., Palmyra, NY (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/161,562

(22) Filed: Jan. 28, 2021

(65) Prior Publication Data

US 2021/0222807 A1 Jul. 22, 2021

Related U.S. Application Data

(63) Continuation of application No. 15/983,449, filed on May 18, 2018, now Pat. No. 10,920,914, which is a
(Continued)

(51) Int. Cl.
*F16J 15/06* (2006.01)
*F16L 23/18* (2006.01)
(Continued)

(52) U.S. Cl.
CPC .............. *F16L 23/18* (2013.01); *F16J 15/061* (2013.01); *F16J 15/125* (2013.01); *F16L 25/026* (2013.01); *F16L 23/036* (2013.01)

(58) Field of Classification Search
CPC ....... F16L 23/036; F16L 25/026; F16L 23/18; F16J 15/125; F16J 15/061
See application file for complete search history.

(56) References Cited

U.S. PATENT DOCUMENTS

| 914,422 A | 3/1909 | Jones |
| 2,252,337 A | 8/1941 | Worthen |
| (Continued) | | |

FOREIGN PATENT DOCUMENTS

| CA | 2320647 A1 | 4/2001 |
| CN | 104121366 A | 10/2014 |
| (Continued) | | |

OTHER PUBLICATIONS

PCT Application No. PCT/US2015/027381, Notification of Transmittal of The International Search Report and The Written Opinion of The International Searching Authority, or The Declaration, Korean Intellectual Property Office, dated Jan. 7, 2016, 5 pages.
(Continued)

*Primary Examiner* — Eugene G Byrd
(74) *Attorney, Agent, or Firm* — Perkins Coie LLP

(57) ABSTRACT

Gasket seals for high pressure applications include retaining elements with inner diameter seal elements that interlock with the retaining element to provide resistance to movement in both axial and radial directions between the retaining element and seal element. High pressure sealing may be accomplished using a metallic core retaining element to which an electrically isolating material is bonded on either or both sides. Sealing is achieved through an inner diameter dielectric sealing element, such as a polytetrafluoroethylene (PTFE) inner diameter sealing ring. Flanges of a joint in a fluid flow ling may be bolted together with the gasket seal interposed therebetween. In the event of pressure changes, the inner diameter seal resists being drawn into the flow line, and resists axial movement relative to the retaining element, through dual locking members that secure the seal to the retaining element.

20 Claims, 11 Drawing Sheets

Related U.S. Application Data continuation-in-part of application No. 29/640,610, filed on Mar. 15, 2018, now Pat. No. Des. 886,253, and a continuation-in-part of application No. 14/606,306, filed on Jan. 27, 2015, now Pat. No. 10,001,235.

(60) Provisional application No. 61/932,880, filed on Jan. 29, 2014.

(51) Int. Cl.
    *F16L 25/02*     (2006.01)
    *F16J 15/12*     (2006.01)
    *F16L 23/036*     (2006.01)

(56) References Cited

U.S. PATENT DOCUMENTS

| | | | |
|---|---|---|---|
| 2,815,973 A * | 12/1957 | Jackson | F16J 15/3236 277/572 |
| 3,195,906 A | 7/1965 | Moyers | |
| 3,215,442 A * | 11/1965 | Papenguth | F16L 23/22 277/611 |
| 3,302,953 A * | 2/1967 | Glasgow | F16J 15/127 277/611 |
| 3,561,793 A | 2/1971 | Rode | |
| 3,595,588 A | 7/1971 | Rode | |
| 3,720,420 A | 3/1973 | Jelinek et al. | |
| 3,721,452 A | 3/1973 | Black | |
| 3,869,132 A | 3/1975 | Taylor et al. | |
| 3,871,668 A * | 3/1975 | Coker | F16J 15/127 277/913 |
| 4,013,299 A * | 3/1977 | Scott | F16J 15/3236 277/910 |
| 4,406,467 A | 9/1983 | Burger et al. | |
| 4,690,438 A | 9/1987 | Kanczarek | |
| 4,750,370 A | 6/1988 | Ossyra | |
| 4,776,600 A | 10/1988 | Kohn | |
| 4,779,903 A * | 10/1988 | Maier | F16L 25/14 285/341 |
| 5,316,320 A | 5/1994 | Breaker | |
| 5,427,386 A | 6/1995 | Breaker | |
| 5,551,703 A | 9/1996 | Morvant | |
| 5,564,715 A | 10/1996 | Wallace | |
| 5,664,791 A | 9/1997 | Owen | |
| 5,758,882 A | 6/1998 | Torzewski | |
| 5,938,246 A | 8/1999 | Wallace et al. | |
| 5,984,316 A | 11/1999 | Balsells | |
| 6,091,175 A | 7/2000 | Kinsinger | |
| 6,173,969 B1 | 1/2001 | Stoll et al. | |
| 6,322,087 B1 | 11/2001 | Swensen et al. | |
| 6,367,802 B1 | 4/2002 | Knapp | |
| 6,402,159 B1 | 6/2002 | Kohn | |
| 6,419,237 B1 | 7/2002 | More | |
| 6,547,255 B1 | 4/2003 | Donaway et al. | |
| 6,695,357 B2 | 2/2004 | Schenk et al. | |
| 6,814,358 B2 | 11/2004 | Keck | |
| 6,854,739 B2 | 2/2005 | Schleth et al. | |
| 7,121,557 B2 | 10/2006 | Christie et al. | |
| 7,350,833 B2 | 4/2008 | Bongiorno | |
| 7,976,074 B2 | 7/2011 | Anderson et al. | |
| 8,181,970 B2 | 5/2012 | Smith | |
| 8,678,398 B2 | 3/2014 | Anderson et al. | |
| 9,062,510 B1 | 6/2015 | Cassel et al. | |
| 9,482,589 B2 | 11/2016 | Ghodrati | |
| 9,726,292 B2 | 8/2017 | Stirnemann et al. | |
| 10,001,235 B2 | 6/2018 | Bander et al. | |
| 10,117,366 B2 | 10/2018 | Dilmaghanian et al. | |
| D886,253 S | 6/2020 | Brown et al. | |
| 10,753,521 B1 | 8/2020 | Daigle et al. | |
| 11,015,710 B2 * | 5/2021 | Brown | F16J 15/064 |
| 2002/0030326 A1 | 3/2002 | Bettencourt | |
| 2002/0074798 A1 | 6/2002 | Duzick et al. | |
| 2004/0256129 A1 | 12/2004 | Matsumoto et al. | |
| 2005/0194750 A1 | 9/2005 | Wallace | |
| 2006/0220324 A1 | 10/2006 | Anderson et al. | |
| 2007/0216111 A1 | 9/2007 | Matsui | |
| 2008/0111313 A1 | 5/2008 | Putch | |
| 2008/0111321 A1 | 5/2008 | Okumura | |
| 2009/0243290 A1 | 10/2009 | Anderson et al. | |
| 2011/0266755 A1 | 11/2011 | Anderson et al. | |
| 2013/0186503 A1 | 7/2013 | Royer | |
| 2013/0328270 A1 | 12/2013 | Stubblefield et al. | |
| 2017/0009918 A1 | 1/2017 | Koves | |
| 2017/0074437 A1 | 3/2017 | Briggs | |
| 2017/0152973 A1 | 6/2017 | Kolb et al. | |
| 2018/0266595 A1 | 9/2018 | Bander et al. | |

FOREIGN PATENT DOCUMENTS

| | | |
|---|---|---|
| FR | 2517789 | 6/1983 |
| GB | 2306790 A | 5/1997 |
| JP | 5-248542 A | 9/1993 |
| JP | 3431460 B2 | 7/2003 |
| JP | 2005014537 | 1/2005 |
| KR | 100496804 B1 | 6/2005 |
| KR | 101559540 B1 | 10/2015 |
| KR | 10020170034793 A | 3/2017 |
| WO | WO 200148415 A1 | 7/2001 |
| WO | WO 2006/107798 | 10/2006 |
| WO | WO 2016171704 A1 | 10/2016 |

OTHER PUBLICATIONS

International Searching Authority, International Search Report and Written Opinion, PCT Application PCT/US2009/038655, dated May 8, 2009, 8 pages.

PCT Application No. PCT/US2018/016011, International Search Report and Written Opinion dated Mar. 26, 2018, 10 pages.

Korean Application No. 10-2017-7033272, Search Report dated Mar. 22, 2018, 9 pages.

Extended European Search Report for EP Application No. 15890105.8 dated Mar. 3, 2019.

* cited by examiner

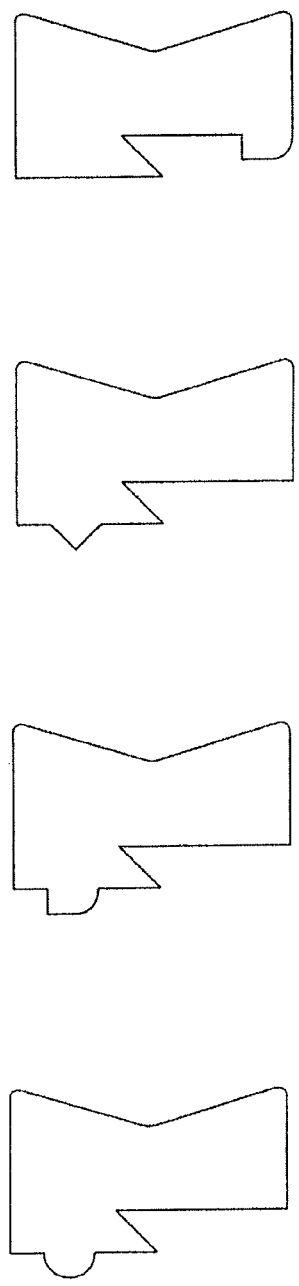

GASKET HAVING INTERLOCKED INNER DIAMETER SEAL ELEMENT

The present application is a continuation of U.S. patent application Ser. No. 15/983,449, filed May 18, 2018, which is a continuation in part of U.S. Design patent application No. 29/640,610, filed Mar. 15, 2018, and a continuation in part of U.S. patent application Ser. No. 14/606,306, filed Jan. 27, 2015, which claims priority to U.S. Provisional Patent Application Ser. No. 61/932,880, filed Jan. 29, 2014, the disclosures of which is incorporated herein by reference as if set out in full.

FIELD

The present disclosure relates generally to an isolation gasket which is adapted to be interposed and compressed between joined pieces of pipe in a flow line that is operative for fluid flow therethrough without leakage. The seal device of the present disclosure is specifically adapted to resist pressure changes in a flow line through an inner diameter seal element that is interlocked to a retaining element.

BACKGROUND

Seal systems using gasket devices are well known and have been used in a variety of applications to prevent fluid from leaking between joined pieces. For example, a seal device is interposed and compressed between flanged end connections of a flow line. In some cases, in-line process control equipment is to be installed at various points in a flow line and may be associated with flanged end connections of a flow line. In-line process control equipment may include such things as valves, pumps, flow meters, temperature controllers, pressure controllers and the like. In addition, ends of pipe sections are provided with flanges so that the sections may be connected, end-to-end, to form the flow line. It is known to provide gasket devices at the interfaces of the joined sections to prevent leakage of the fluid at the joint.

Regardless of the nature of the joint, that is, whether it is between the joined sections of pipe or whether for some other purpose, such as, for example, joints used to connect in-line process control equipment, it is desirable for a gasket device and seal system to be selected based on various factors that are associated with a particular joint and the particular media that is conveyed through the joint. These factors include the corrosive nature of the media flowing through the pipe line as well as the physical characteristics of that flowing media. Such physical characteristics include the pressure, temperature and velocity of the media, as well as anticipated changes in the pressure (including a dramatic change in pressure due to rupture), temperature and velocity of the media. Additionally, in many cases it is also necessary to not only provide a reliable seal for the joint but to also electrically isolate one side of the joint from the other.

SUMMARY

The technology of the present application recognizes that a sealing system that can contain high pressures and provide an inner diameter seal element that can withstand significant changes in pressure would be a significant improvement in the field of effective flow line sealing. Embodiments disclosed herein provide sealing systems for high pressure applications. The sealing systems comprise one or more retaining elements having an inner diameter with one or more inner diameter seal elements. The inner diameter seal element(s) interlocks with an inner diameter portion of the retaining element(s) to provide resistance to movement in at least a radial direction between the retaining element(s) and seal element(s). The retaining element(s) provide resistance to movement in both the outer and inner radial direction. In one aspect of the technology, high pressure sealing is accomplished using a metallic core retaining element to which an electrically isolating material may be bonded on either or both sides. Sealing is achieved through an inner diameter dielectric sealing element, such as a polytetrafluoroethylene (PTFE) inner diameter sealing ring. The inner diameter sealing ring may be a flat or profiled surface, such as, for example, a kammprofile. Flanges of the joint may be bolted together with the seal interposed therebetween. In the event of pressure changes, the inner diameter seal resists being drawn into the flow line and resists axial movement relative to the retaining element through the locking member(s) that secure the inner diameter seal element to the retaining element. In additional aspects, the technology may be provided with other configurations including, one or more backup seals in the retaining element, one or more backup seals in the inner diameter seal, and one or more compression limiters within either the inner diameter seal or the retaining element.

In one aspect, the technology of the present application provides a gasket seal apparatus for use between joined pieces in a flow line that is operative for fluid passage therethrough. The gasket seal comprises (A) a retaining ring having opposing side surfaces and an inner diameter opening formed therein, the retaining ring comprising: a radial lock feature forming a circumferential rim about the inner diameter opening; and (B) an inner diameter seal element having an inner seal surface, an outer seal surface, and a locking portion, the locking portion comprising: a leg and a lip that cooperatively engage with said radial locking feature, wherein the cooperative engagement substantially prevents relative radial movement between the retaining ring and the inner diameter seal element. The radial locking features and members are interlocked so as to substantially prevent radial movement between the retaining ring and the inner diameter seal element. The retaining ring, in one aspect, may have a metal core and a layer of dielectric material disposed on at least one of said opposing side surfaces. The retaining ring may further include a groove formed on each of the opposing side surfaces and a secondary seal element disposed in each of the grooves.

In one embodiment, the radial locking feature comprises a radially extended flanged surface and projection forming a recess in the retaining ring and the radial locking member on the inner diameter sealing element comprises a complimentary flanged surface and projection forming a recess to allow interlocking of the retaining ring and locking member. The inner seal surface may have a chevron-shaped pressure activated surface, for example.

In another aspect, the present disclosure provides a gasket seal apparatus for use between joined pieces in a flow line that is operative for fluid passage therethrough. The gasket seal comprises (A) a retaining ring comprising a core material having a core inner surface, a first side surface, and a second side surface opposing the first side surface, a first layer of surface material coating the first side surface and a second layer of surface material coating the second side surface, wherein: (i) the core material comprising a recess in the first side surface wherein said recess forms an inner diameter circumferential ring, (ii) the first layer of surface material comprising a circumferential groove in a first material inner surface, wherein the first material inner surface is placed radially outward of the core inner surface, and (iii) the second layer of surface material comprising a second material inner surface substantially aligned with the core inner surface; and (B) a seal element having an inner seal surface, an outer seal surface, a hook, and an axial lock protrusion, wherein: (i) the hook comprises a leg and a lip that form a recess with the outer seal surface such that the recess cooperatively engages the rim to prevent relative radial movement between the retaining ring and the seal element; and (ii) the axial lock protrusion extends from the leg of the hook and cooperatively engages the circumferential groove to prevent relative axial movement between the retaining ring and the seal element.

In still a further aspect, the present disclosure provides an isolation system that provides an interface between joined flange pieces, each having an inner and an outer face, in a flow line that is operative for fluid passage therethrough, comprising: a gasket seal comprising (A) a retaining ring having opposing side surfaces and an inner diameter opening formed therein, the retaining ring having (i) an axial lock feature comprising a rectangular groove formed on said inner diameter opening, and (ii) a radial lock feature comprising a rectangular recess and rim formed on said inner diameter opening, and (B) a seal element having an inner seal surface and an outer seal surface, the outer seal surface comprising (i) an axial lock protrusion engaged with the rectangular groove, and (ii) a radial lock member engaged with the rectangular recess and the rim, wherein said axial and radial lock features and members are cooperatively engaged so as to substantially prevent relative axial and radial movement between said retaining ring and the seal element; at least one insulating sleeve receivable in an aligned bore formed in each joined flange piece, the sleeve having a length that is substantially equal to a distance between outer faces of the joined flange pieces with the gasket seal interposed therebetween; at least one elongate metal fastener having opposing ends, the fastener being receivable in the insulating sleeve for connecting joined flange pieces to one another with the gasket seal interposed therebetween; and at least one insulating washer receivable on the at least one elongate metal fastener abutting at least one of the flange piece outer faces. The metal fastener may further comprise a metal shaft threaded to receive a nut on at least one of the opposing ends. The retaining ring may further comprise a groove formed on each of the opposing side surfaces and a secondary seal element disposed in each of the grooves. The radial locking feature, in an embodiment, comprises a wedge-shaped recess formed in the retaining ring, and the radial locking member comprises a complimentary wedge-shaped projection that extends into the wedge-shaped recess. The axial locking feature, in an embodiment, comprises a semi-circular shaped recess formed in the retaining ring, and the axial locking member comprises a complimentary semi-circular shaped projection that extends into the semi-circular shaped recess.

These and other advantages and novel features of the disclosure will be set forth in part in the description which follows, which discloses various embodiments, including the currently preferred embodiment.

BRIEF DESCRIPTION OF THE DRAWINGS

FIGS. 8A-8D are cross-sectional views of seal members with different vertical locking elements according to several exemplary embodiments;

DETAILED DESCRIPTION

Figure 1:
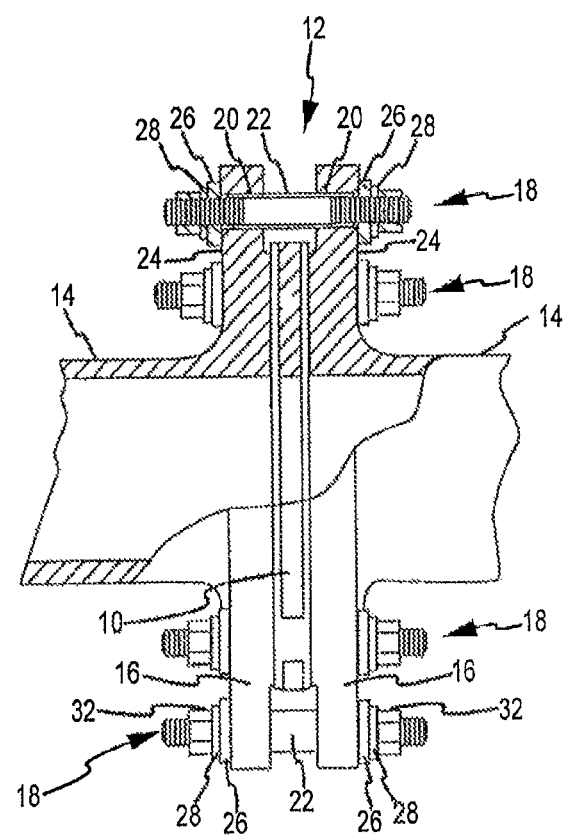
FIG. 1 is a side view, partially in cross-section, showing an isolation gasket and sealing system according to a first exemplary embodiment of the present disclosure.

For a more complete understanding of the technology of the present application, reference is now made to the following detailed description of several exemplary embodiments as illustrated in the drawing figures, in which like numbers represent the same or similar elements. Various embodiments are described herein, with specific examples provided in many instances to serve to illustrate and discuss various concepts included in the present disclosure. The specific embodiments and examples provided are not necessarily to be construed as preferred or advantageous over other embodiments and/or examples. Furthermore, concepts described herein may be used with numerous different variations of sealing gaskets and sealing systems. For example, an inner diameter seal may be used with a retaining member and secondary sealing elements and/or compression limiter such as described in U.S. Pat. No. 7,976,074, issued Jul. 12, 2011, entitled "ISOLATION GASKET, SYSTEM, AND METHOD OF MANUFACTURE," the entire disclosure of which is incorporated herein by reference as if set out in full.

As mentioned above, the technology of the present application provides, among other things, a solution to problems that may occur with currently known inner-diameter seals in that the seal can collapse into the bore of the piping system during variations in piping pressure, including rapid decompression of the piping pressure, when a vacuum is pulled into the piping systems, and/or when suction is caused by the flow of the media past the seal. Having the seal collapse into the bore can cause significant problems as, in certain situations, when the system is repressurized the media will escape past the collapsed seal, come into contact with the retainer, and possibly escape to the environment or outside of the piping system. Further, the collapsed seal may be transported down the piping system where it may cause other problems such as obstructions with other piping components, damage or the like to moving components such as pumps or the like, contamination of processing systems, and/or jamming of pigging operations, to name a few.

The technology of the present application is generally directed to an isolation gasket adapted to be used in a joint that inhibits, prevents, or substantially reduces the likelihood of a seal collapse into the bore of the joint, which generically is in a piping system. Such joints may be a flange connection between two sections of pipeline, which are connected in end-to-end relation. In other aspects, the joint may be a connection used to connect monitoring equipment to the flow line, which may be flanged or other types of connections. Other joints may not include flanged surfaces as the above referenced conventional joints. Accordingly, the technology disclosed in the present application is described in reference to a conventional flanged connection such as, for example, the flanged connection used with end-to-end connection of a pair of pipeline sections, but it should be clearly understood that the present invention is not limited to such flanged connections.

With reference now to FIG. 1, a sealing gasket 10 is located in a flange connection 12 between two pipe sections 14 in a flow line application. Each of pipe sections 14 includes flanges 16 which may be placed in confronting relationship with gasket 10 therebetween. Flanges 16 are provided with bores 20 which align with one another so that flanges 16 may be connected by nut 32 and bolt 18 sets, as is known in the art.

Figure 2:
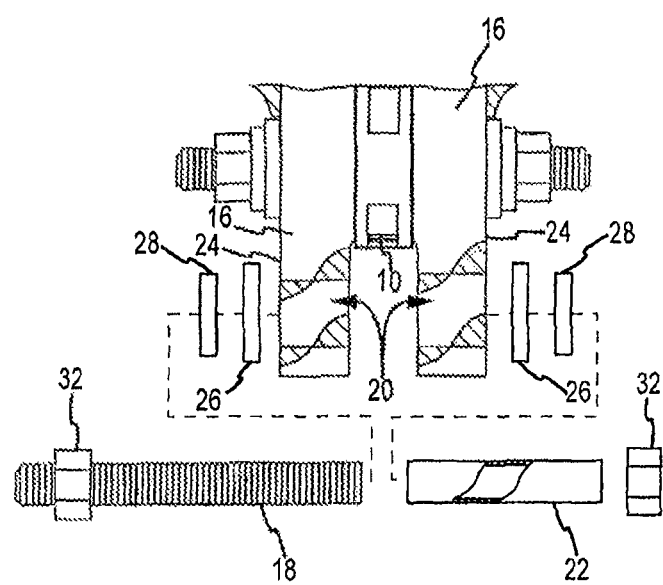
FIG. 2 is an enlarged side view in partial cross-section showing a representative nut and bolt set used with various insulating components for electrically isolating a flange joint for various exemplary embodiments.

With continued reference to FIG. 1, and with reference to FIG. 2, some embodiments provide for electrical isolation between flanges 16, which may be accomplished by a plurality of different components associated with each aligned pair of bores 20. In this embodiment, a pair of aligned bores 20 is provided with a non-conductive sleeve 22 constructed, for example, of a glass reinforced polymer although other materials, such as epoxy, phenolic and nomex materials may be suitably employed. Sleeve 22 is dimensioned to have a length that is about the same as the distance between outer surfaces 24 of flanges 16 and the thickness of gasket 10 interposed therebetween. Once sleeve 22 has been inserted into a pair of aligned bores 20, insulating washers 26 are placed on either side of bores 20 on outer surfaces 24 of flanges 16. In this embodiment, optional metal washers 28 are then positioned against washer 26 and bolt 30 is passed through the washers and sleeve 22 after which it is secured by nuts 32. In some cases, the insulating washers 26 may have metallic cores for strength and the like such that the optional metal washers 28 are not necessary. This assembly is undertaken for each of the aligned bores 20 after which nuts 32 may be tightened to compress gasket 10 at a desired pressure. Rather than nuts 32 on opposing sides of the nut 32 and bolt 18 set, the bolt 18 may be provided with a head in place of one of the nuts 32.

To facilitate electrical isolation between the pipe sections 14, the gasket 10 may include an outer layer of a dielectric material. Thus, various embodiments described herein contemplate a gasket 10 having a dielectric coating on one or both sides, insulating washers 26, and non-conductive sleeves 22, to provide electrical isolation of separate pipe sections 14. The dielectric coating is only required to be on conductive portions of the gasket 10. Insulating washers 26, as illustrated in FIGS. 1-2, are positioned against outer surfaces 24 of flanges 16 and, in combination with sleeve 22, provide electrical isolation between the nut 32 and bolt 18 sets and the flanges 16. The insulating washers 26 may be metal core washers that are coated with a dielectric material. Similarly, the dielectric outer layer on the gasket 10 provides electrical isolation between the confronting flanges surfaces of flanges 16.

Figure 3:
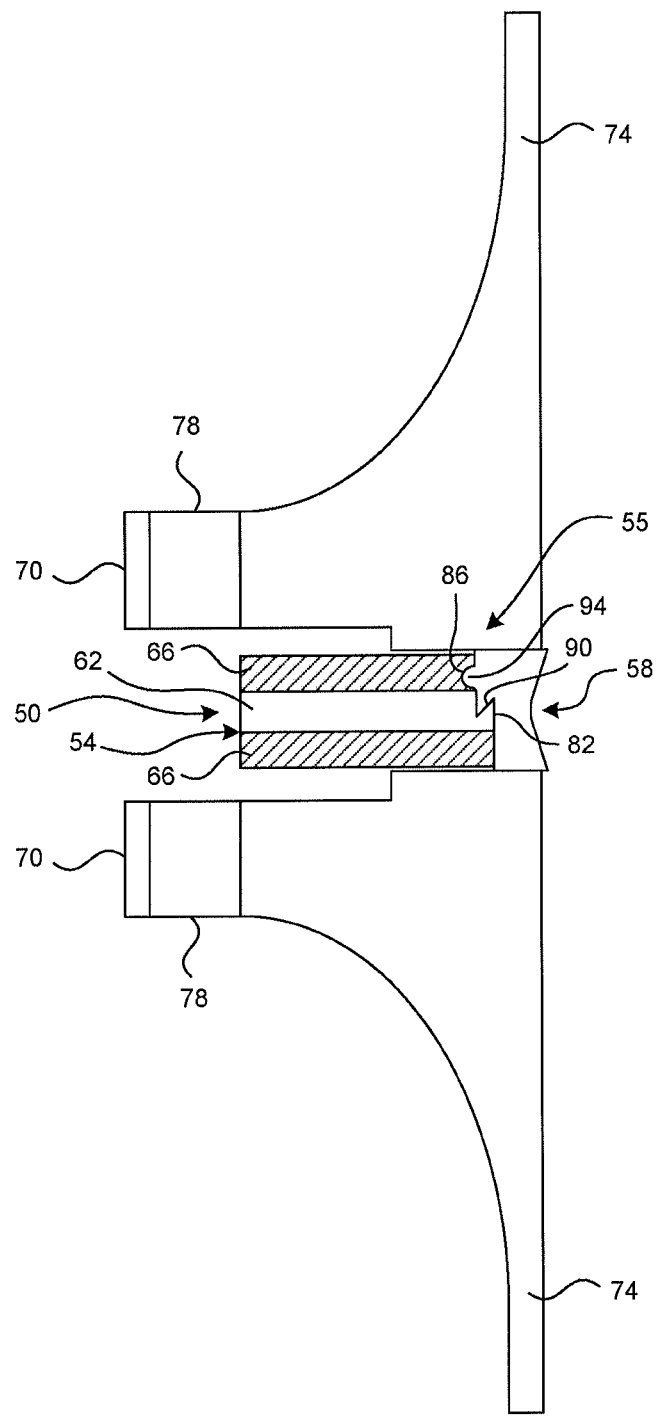
FIG. 3 side cross-section view of one-half of a flange joint showing a gasket according to an exemplary embodiment.

FIG. 3 illustrates a cross-section of a portion of a flange connection having a gasket 50 consistent with the technology of the present application. The gasket 50 in this example includes a retaining ring 54 and an inner diameter seal element 58. The inner diameter seal element 58 is sized to fit within the inner diameter of the retaining ring 54. The retaining ring 54, in this embodiment, has a metal core 62 and a coating of material 66 on each side of the metal core 62. In other embodiments, the gasket 50 may have a non-metallic core for strength. When the gasket 50 has a non-metallic core, the coating of material 66 may not be necessary for electrical isolation. In one exemplary embodiment, the coating of material 66 is a dielectric material. The coating of material 66 may comprise a sealing material, such as polytrafluoroethylene (PTFE) or other fluorinated polymer to allow the coating material to act as a secondary seal should the seal element 58 fail. In another aspect, the coating material 66 may be a copolymer PTFE, such as, a composite of PTFE and polyfluoroethylene (PFE). When the coating of material 66 is a dielectric material, the retaining ring 54 provides electrical isolation between flanges 70. The flanges 70 connect pipe sections 74, and include axial bores 78 that may receive bolts and nuts assemblies, such as the aforementioned bolts 18 and nuts 32, or other means to couple the joint components together under a compressive loading. To facilitate electrical isolation, isolation sleeves 22 may be provided along with isolation washers 26 to secure the flanges 70 together in a manner similar as described above with respect to FIGS. 1 and 2. Alternatively, the bolts 18 and nuts 32 may be made from an electrically inert material. As can be appreciated now, on reading the disclosure and reviewing the figures, the seal element 58 comprises a dielectric or non-conducting material, such as, for example, the aforementioned PTFE or other fluorinated polymer to name but two potential compositions for the seal element 58.

Figure 4:
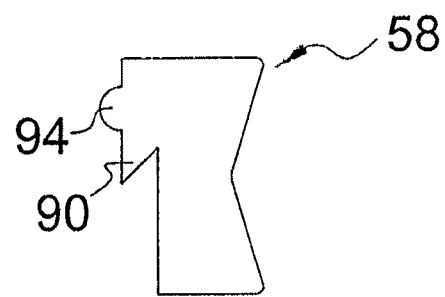
FIG. 4 is a cross-sectional view of the inner-diameter sealing member of a gasket for an exemplary embodiment.
Figure 5:
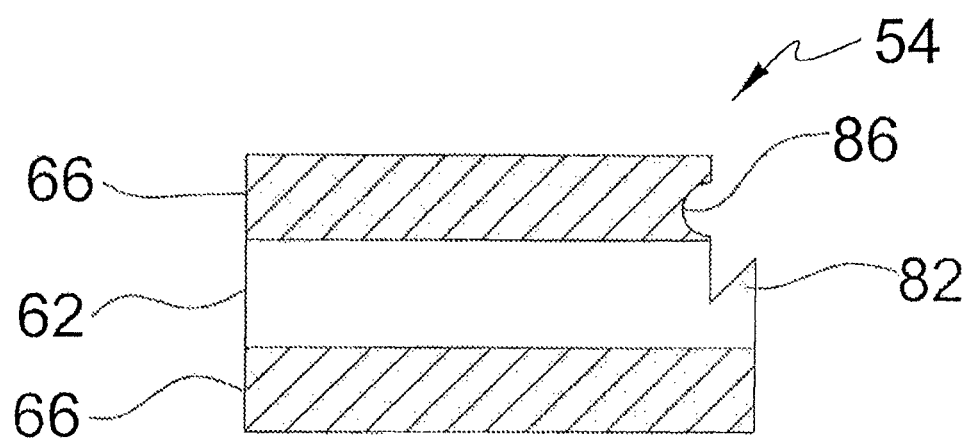
FIG. 5 is a cross-sectional view of a retaining member of an exemplary embodiment.

In the embodiment of FIG. 3 the inner diameter seal element 58 and the retaining ring 54 include one or more locking mechanisms 55 that help secure the inner diameter seal element 58 to the retaining ring 54. Generally, the locking mechanism 55 includes a first portion on the retaining ring 54 and a second portion on the seal element 58 that couple to provide a lock between portions. The locking mechanisms 55 described in the present application may be interchangeable between the seal element 58 and the retaining ring 54 although the features may only be described on one or the other. FIG. 4 illustrates a cross section of the inner diameter seal element 58 of this embodiment, and FIG. 5 illustrates a cross section of the retaining ring 54 of this embodiment. In the exemplary embodiment shown in FIGS. 4 and 5, the retaining ring 54 includes a radial locking element 82 and an axial locking element 86. As used herein, the radial direction is along the radius of a cross section of the joint and the axial direction is along the media flow direction associated with the joint. The inner diameter seal element 58 includes a complimentary radial locking feature 90, and axial locking feature 94. In this manner, the radial locking element 82, and complimentary radial locking feature 90 interlock to help retain the inner diameter seal element 58 to the retaining ring 54 and prevent relative radial movement between the two. In prior designs without radial locking feature, pressure changes within the flow line could potentially result in an inner diameter seal delaminating from the associated retaining member and being drawn into the flow line, resulting in loss of seal at the flange joint, and possibly other undesirable consequences. The axial locking element 86, and complimentary axial locking feature 94 also interlock to help retain the inner diameter seal element 58 to the retaining ring 54 and prevent axial movement between the two. In this embodiment the radial locking element 82 and complimentary radial locking feature 90 are interlocked through an inclined, or wedge-shaped, surface, such that in order to disengage the radial locking element 82 and radial locking feature 90 the seal element 58 would need to be moved in an axial direction relative to the retaining ring 54. The axial locking element 86 and the axial locking feature 94 work to prevent such movement, thereby helping to keep the inner diameter seal element 58 engaged to the retaining ring 54, which also reduces the tendency of delamination between the inner diameter seal element 58 and the retaining ring 54. In such a manner, the complimentary radial and axial locking mechanisms between the inner diameter seal element 58 and the retaining ring 54 help to prevent the intrusion of the seal into the bore during pressure changes, such as negative pressure, rapid decompression or suction from the media that is flowing through the pipe sections 74.

Figure 7C:
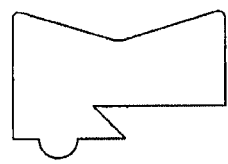
FIGS. 7A-7C are cross-sectional views of pressure activated seal members according to several exemplary embodiments.
Figure 7B:
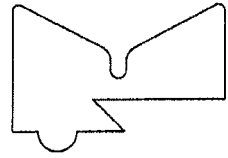
Figure 7A:
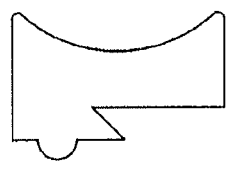

The inner diameter seal element 58 may be formed from any of a number of sealing materials. In an exemplary embodiment, the seal element 58 is constructed of a chemically inert material, such as, PTFE that is held in place by the retaining ring 54. The inner diameter seal element 58, in an embodiment, is machined from a billet of PTFE material, although other types of material may be used, such as rubber or other types of elastomeric material. Also, instead of machining, the PTFE may be molded, extruded, or formed using other methods of formation. In the embodiment of FIGS. 3 and 4, the inner face of inner diameter seal element 58 seal is made in a chevron style configuration that is pressure activated and effects sealing of the piping media between the flanges 70. In other words, the inner diameter seal element has an inner radial surface that forms a V or concave shape such that the pressure of the media being sealed provides a sealing force tending to straighten the inner radial surface and causing a sealing force to be applied. Of course, the inner diameter seal element 58 may have one of any number of different configurations that provide sealing of the piping media other than the V or concave shape, and a few examples of such V or concave configurations are illustrated in FIGS. 7A through 7C. It will be readily recognized by one of skill in the art that the inner diameter sealing element 58 may have various other configurations that may be selected based on a particular application in which the seal is to be used.

The retaining ring 54 may be constructed of many various materials such as polyimide, glass reinforced epoxy, carbon steel, stainless steel, or a "sandwich" of steel with laminate material bonded on either side such as illustrated in FIGS. 3 and 5. As can be appreciated, the retaining ring 54 is shown having flat opposed surfaces. In some aspects, the retaining ring 54 may be used as a secondary seal in which case the profile may be a kammprofile comprising a series of ridges and grooves or a convex surface opposed to the relatively flat flanged surface shown in FIG. 3.

The retaining ring 54 may be machined, molded, or otherwise shaped with a corresponding shape as the outer surface of the inner diameter seal element 58 to accept the interlocking features of the inner diameter seal element 58. The retaining ring 54 may have a sufficient outer diameter to sit on the bolts of the flanges 70. Thus, to align the retaining ring 54, and hence the inner diameter sealing element, the retaining ring 54 is received on a bolt 18 (with or without an isolation sleeve 22). The retaining ring 54 acts, in this case, as a gasket centralizer to ensure the gasket 50 is properly aligned to the flange bore. In one exemplary embodiment, the retaining ring 54 is aligned to one of the flange 70 faces and the inner diameter seal element 58 is then assembled onto the retaining ring 54 to create the gasket 50 prior to securing the flanges 70 together with bolts through the axial bores 78 to create a seating stress acting on the lateral faces of the inner diameter seal element 58, thereby preventing media from escaping the assembly. If electrical isolation is required, then isolation sleeves and washers will be included in the package, similarly as described above with respect to FIGS. 1 and 2.

Figure 6:
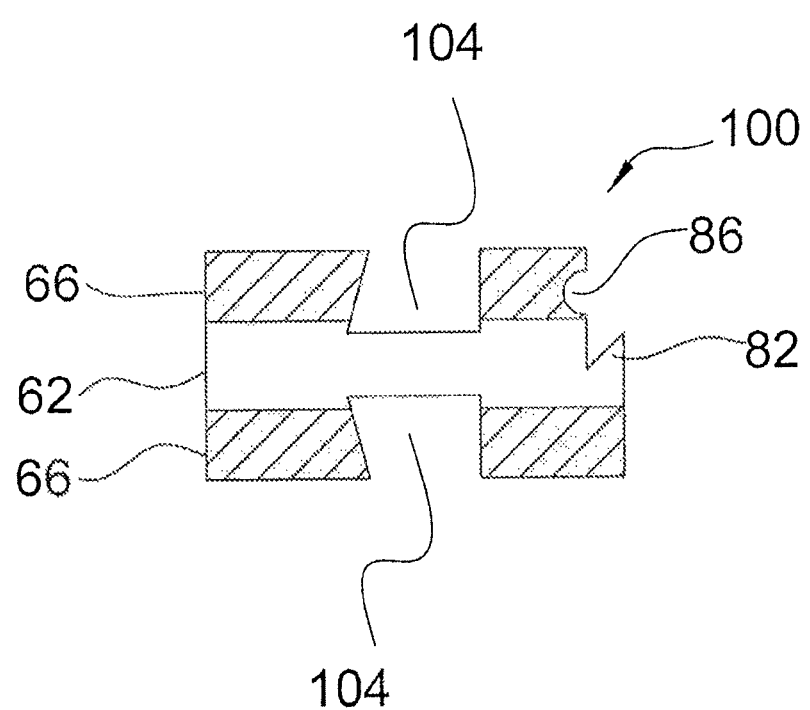
FIG. 6 is a cross-sectional view of a retaining member of another exemplary embodiment.

In certain aspects of the technology disclosed herein, the retaining ring 54 may include one or more grooves that contain secondary seal elements and/or compression limiters. A retaining ring 100 of an exemplary embodiment is illustrated in FIG. 6. In this embodiment, the retaining ring 100, similarly as retaining ring 54, has a metal core 62 and a coating of material 66 on each side of the metal core 62 to provide electrical isolation between flanges in a flow line. The retaining ring 100 includes a groove 104 located on at least one side, and in some aspects on both sides as shown in FIG. 6, of the retaining ring 100. Notice the grooves 104 in the exemplary embodiment are shown as vertically aligned in the radial direction. In certain aspects, the grooves 104 may be offset in the radial direction. A secondary sealing element, such as an o-ring, an E-seal, a spring-energized PTFE lip seal, or the like may be placed in the groove or grooves 104 to provide a secondary, or fail safe, seal to prevent leakage in the event of the failure of the inner diameter seal element 58. In some embodiments, the secondary seal element is a metal seal, and a compression limiter is placed in the groove 104, similarly as described in above-noted U.S. Pat. No. 7,976,074, the entire disclosure of which is incorporated herein by reference as if set out in full. The axially extending sides 105 of grooves 104 may be beveled at an angle between about 75 to 90 degrees, such as, for example, the radially outward side 105 as shown in FIG. 6. Such a beveled surface provides enhanced retention of a lip seal that may be disposed in one or both of the grooves 104 such that when media applies pressure to the lip seal, the seal is pressured against the inside surface of the beveled groove 104 and thus forced into the groove 104. As will be understood, the dimensions of the embodiment of FIG. 6 are exemplary, and other suitable dimensions may be used in various different applications as will be readily apparent to one of skill in the art. In non-failure operation, the gasket 50, including either retaining ring 54 or 100, is installed in a joint, with the inner diameter sealing element 58 containing the media within the joint. In the event of a failure of the primary seal of sealing element 58, the secondary seal located in groove 104 may facilitate containment of the media within the joint.

Figure 9A:
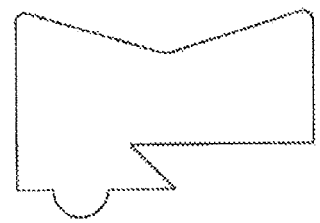
FIGS. 9A-9C are cross-sectional views of seal members with different radial locking elements according to several exemplary embodiments.
Figure 9B:
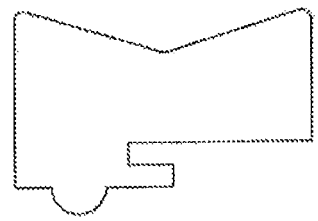
Figure 9C:
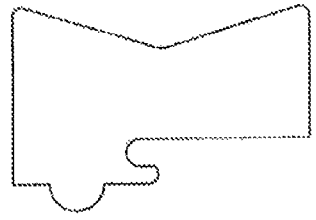

As discussed above, embodiments of the present disclosure provide an inner diameter seal and retaining ring that are interlocked so as to prevent relative movement between the two. It will be readily recognized by one of skill in the art that the locking mechanisms between the seal and retaining ring may take on various different configurations. For example, FIGS. 8A through 8D illustrate various different configurations that may be used to prevent axial and radial movement between an inner diameter seal element and a retaining ring. FIGS. 9A through 9C illustrate various different configurations that may be used to prevent axial and radial movement between an inner diameter seal element and a retaining ring. It will be understood that any combination of these illustrated features, as well as other configurations, may be used to achieve enhanced physical locking of retaining rings and inner diameter seal elements. In various embodiments, gasket seals such as the types described include an adhesive between the retaining ring and seal element to secure the two together.

Figure 10:
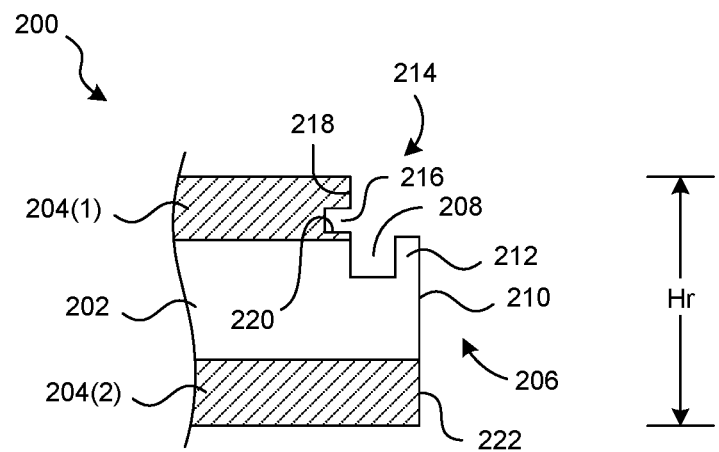
FIG. 10 is a cross-sectional view of a retaining member of an exemplary embodiment.
Figure 11:
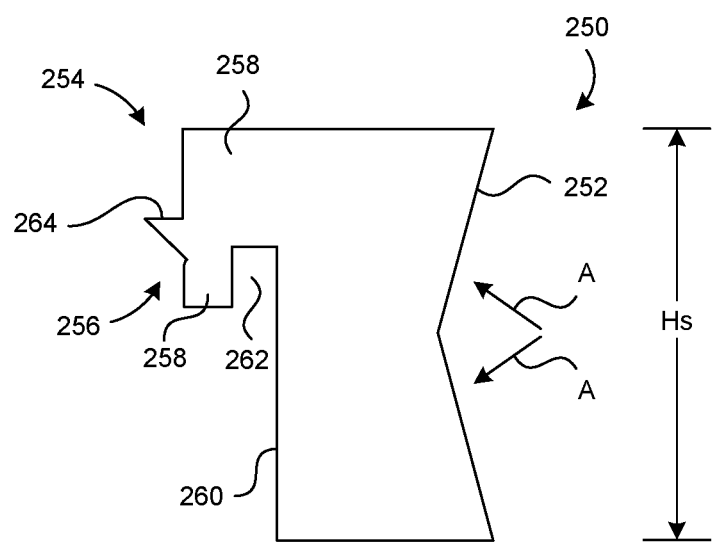
FIG. 11 is a cross-sectional view of the sealing member of a gasket for an exemplary embodiment.

The retaining ring 54 with a curved or tapered surface such as axial locking element 86, which has a concave shape, and radial locking element 82, which has a tapered or angled shape, along with the axial locking feature 94, which is convex to mate with axial locking element 86, and radially locking feature 90, which is a wedge to mate with radial locking element 82, are provided in part to inhibit the inner diameter sealing element from buckling inwardly during seal expansion as a result of decompression or thermal changes. The interaction of the axial and radial locking elements and features, as shown in FIGS. 4 and 5, provide a less than ideal reaction vector to resist the motion, which may result in delamination or the like of the gasket. As shown, the angled reaction vector would be at approximately 45 degrees whereas the groove and bead reaction vector would be at a tangent somewhere off the perpendicular. With reference now to FIGS. 10 and 11, a retaining ring 200 (FIG. 10) and an inner diameter seal element 250 (FIG. 11) are provided. The vertical and horizontal arrangements of the locking elements and features, as will be explained below, provide improved resistance to relative movement as the reaction vectors are perpendicular to the direction of movement.

With specific reference to FIG. 10, the retaining ring 200 is shown in more detail. The retaining ring 200 has a height $H_r$, which will be explained further below. The retaining ring 200 comprises a core material 202, such as a metal or elastic material, and surface materials 204(1), 204(2) coated on opposing sides of the core material 202, although in certain aspects neither side or only one side of the core material 202 is coated. The coating material may be any material mentioned heretofore.

The retaining ring 200 provides a radial locking element 206. The radial locking element 206 comprises a rectangular recess 208 formed in the metal core 202. The recess 208 is formed in the metal core 202 a radial distance outward from the core inner surface 210 forming an inner rim 212 around the inner circumference of the metal core 202.

As shown in FIG. 10, the retaining ring 200 also comprises an axial locking element 214. The axial locking element 214 is a rectangular groove 216 formed in the surface material 204 adjacent the radial locking element 206. The rectangular groove 216, in this exemplary embodiment, is formed about the circumference of a first material inner surface 218 an axial distance from the core material to form a leg 220 that rests on the core material 202. The first material inner surface 218 is formed in surface material 204(1). A second material inner surface 222 is formed in the surface material 204(2) on the opposite side of the core material 202. The first material inner surface 218 is offset radially outward from the second material inner surface 222. The second material inner surface 222 is aligned with the core inner surface 210. The first material inner surface 218 is offset radially outward from the second material inner surface 222 by the distance of the inner rim 212 plus the distance of the recess 208 formed in the metal core 202.

With specific reference now to FIG. 11, the inner diameter seal element 250 is shown in more detail. The inner diameter seal element 250 has a height $H_s$ that is greater than $H_r$. Providing that the inner diameter seal element 250 has a height $H_s$ greater than the height $H_r$ of the retaining ring 200 provides a number of benefits. One benefit relates to ensuring compression of the inner diameter seal element 250 by the confronting flanges surfaces that facilitates a positive seal being formed. Another benefit includes providing for a controlled compression expansion. In other words, when compressed axially, the inner diameter seal element 250 attempts to expand radially. The retaining ring 200 inhibits outward radial expansion such that the inner diameter seal element 250 tends to radially expand inwardly. The radially inwardly expansion decreases the volume void ratio such that the seal bore is a closer size alignment with the joint bore, which improves corrosion resistance to name one benefit. The inner diameter seal element 250 has an inner surface 252. The inner surface 252 is chevron shaped as discussed above such that media pressure on the inner surface 252 applies force as shown by arrows A tending to seat the inner diameter seal element 250 against the flanges (not shown in FIGS. 10 and 11). The chevron or generally concave shape(s) and the like may be considered a surface to be inwardly converging to a point internal to the surface, which in this case is the center point.

The inner diameter seal element 250 has a locking portion 254 that comprises parts corresponding to the radial locking element 206 and the axial locking element 214 of the retaining element 202. The locking portion 254 comprises a hook 256 that hooks about the rim 212 described above. The hook 256 may be considered the radial lock for this aspect of the technology. The hook 256 of the locking portion 254 comprises a leg 258 and a lip 260 that together form a recess 262. The recess 262 is sized to fit the inner rim 212. The leg 258 is sized to fit within the rectangular recess 208. The lip 260 extends along the core inner surface 210 and the second material inner surface 222. In one aspect, the outward radial movement is resisted by a surface to surface contact.

The locking portion 254 also comprises an axial lock protrusion 264. The axial locking protrusion 264 is sized to fit within the rectangular groove 216 and is generally protruding from the leg 258 rather than the lip 260. The axial locking protrusion 264 forms a circumferential shelf surface $264_s$ that abuts at least one wall of the rectangular groove 216. As shown, the axial locking protrusion 264 is formed as a wedge having a triangular cross section. The wedge shape facilitates the axial locking protrusion 264 engaging with the rectangular groove 216. The circumferential shelf surface $264_s$ is generally downstream facing to provide a surface to surface resistance to axial movement. The wedge shape facilitates insertion of the axial locking protrusion 264, but the axial locking protrusion 264 could have a shape sized to cooperatively fit into the rectangular groove 216, e.g., be a block shape for example.

Figure 12A:
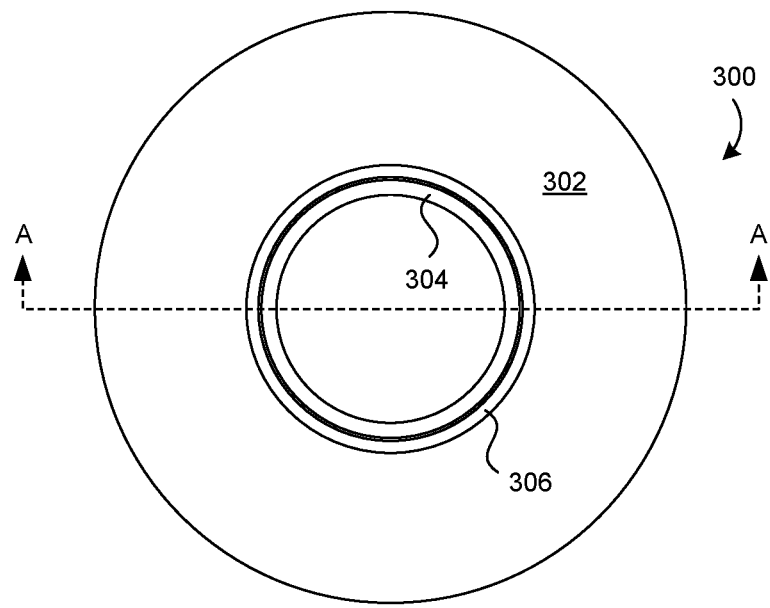
FIG. 12A is an elevation view of another annular sealing member of an exemplary embodiment.
Figure 12B:
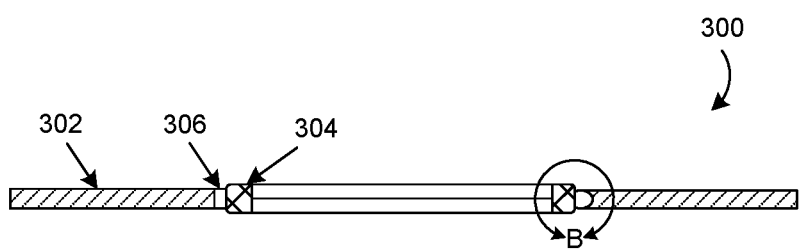
FIG. 12B is a cross-sectional view of the annular sealing member of FIG. 12A
Figure 12C:
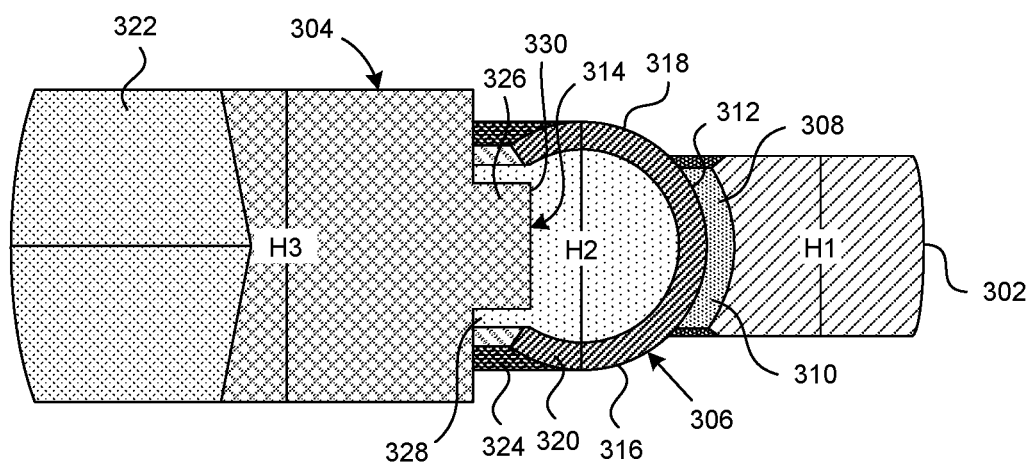
FIG. 12C is a detail of the cross-section of FIG. 12B.

FIG. 12A shows an elevation view of an isolation gasket 300. FIG. 12B shows a cross-sectional view of the isolation gasket 300. FIG. 12C shows a detail of the cross section of FIG. 12B. The isolation gasket 300 has a retraining ring 302 and an inner seal 304 similar to the above described technology. The isolation gasket 300 also has a C-clamp 306 interspersed between the retaining ring 302 and the inner seal 304. The inner seal 304 is generally formed of a the material identified above for the inner seal elements. The C-clamp 306 may be formed of a non-conductive material, such as ceramics, composites, and the like, or metals. The retaining ring may be formed from a non-conductive material as well but typically is a metal. When formed from metals, the C-clamp 306 and the retaining ring 302 have non-conductive material applied to the surfaces, such as the material 204 described above.

With reference to FIG. 12C, the retaining ring 302 is shown having a first axial height of H1. The retaining ring 302 has an inner retaining ring surface 308 that has a first shape 310. The shape 310 in this exemplary embodiment is a concave shape, which will be explained further below. The inner retaining ring surface 308 cooperatively engages an outer C-clamp surface 312 of the C-clamp 306. The outer C-clamp surface 312 is convex, which is shaped to cooperatively engage the inner retaining ring surface 308. Other shapes of the inner retaining ring surface 308 and the outer C-clamp surface 312 are possible. While shown is similar shapes, the shapes may be different. For example, the C-clamp 306 may have a E-shape, which would provide a convoluted outer C-clamp surface 312, and the inner retaining ring surface 308 may still be a concave shape to cooperatively engage the outer C-clamp surface.

The C-clamp 306 has an inner C-clamp opening 314, which is opposite the outer C-clamp surface 312. The C-clamp 306 has seal arms 316 extending from the outer C-clamp surface 312 to the inner C-clamp opening 314. The seal arms 316 have an apex 318, which is shown approximately ½ the radial distance between the outer C-clamp surface 312 and the inner C-clamp opening 314. The apex 318 has an uncompressed axial height H2, which is greater than the axial height H1. Thus, when the isolation gasket 300 is compressed, the axial height of the C-clamp 306, at least at the apex 318, will decrease causing ends 320 of the seal arms 316 to approach each other, in other words, the inner C-clamp opening 314 will decrease in size, which will be explained further below.

The inner seal 304 has an inner seal surface 322 and an opposed outer seal surface 324. The inner seal 304 has a protrusion 326 (or annular ridge 326) extending from the outer seal surface 324. The inner seal surface 322 is shown as having a chevron shape. The protrusion 326 is shaped to fit within the C-clamp opening 314. In this exemplary embodiment, the protrusion 326 is a block shape, but other shapes are possible. The inner seal 304 has an uncompressed axial height H3, which is greater than axial height H2.

The inner seal 304 has an outer diameter to the outer seal surface 324. The outer diameter in certain embodiments may be slightly larger than the inner diameter of the C-clamp 306 at the C-clamp opening 314. The slightly larger outer diameter ensures the inner seal 304 forms a snap fit connection with the C-clamp 306. The inner seal 304 may expand axially into the C-clamp 306 through the inner C-clamp opening 314 in certain configurations. In certain embodiments, the inner seal 304 may be compressed radially to fit within the C-claim 306 and allowed to uncompress radially to for a friction fit with the C-clamp 306.

As explained above, the ends 320 of the seal arms 316 will move towards each other when the C-clamp 306 is compressed by the joint during installation. The ends 320 in certain embodiments may compress onto opposing surface 328 of the protrusion 326, which may grip the inner seal 304. In certain embodiments the ends 320 may pierce the surfaces 328 of the protrusion 326 to enhance the connection between the inner seal 304 and the C-clamp 306.

As can be appreciated, the C-clamp 306 also provides a secondary seal. The seal arms 306 proximal the apex 318 form a seal with the joint surfaces providing the compression. The secondary seal provided by the C-clamp 306 provides for safety in case of a primary seal failure by inner seal 304. The secondary seal provided by the C-clamp 306 also becomes a primary seal in certain catastrophic failure situations, such as fire that destroys the primary inner seal 304. The secondary seal also provides sealing in the unusual event of the inner seal 304 not being retained by the C-clamp 306.

The C-clamp 306 and inner seal are connected by frictional forces and the ends 320 on the surfaces 328, both of which serve to provide an axial lock and a radial lock for the inner seal 304. To facilitate the connection, the surfaces 328 may have one or more axially extending ridges 330.

As will be appreciated by those skilled in the art, industries such as the oil and gas industry, utilize many, many miles of connected metal pipelines that are subjected, for example, to a natural flow of current through the pipeline and across the metal-to-metal flange connections in the pipeline which causes the flange connections to corrode and build up corrosion similar to battery terminals. The isolation gasket for embodiments of the invention interrupts that current flow through a pipeline and prevents the flanges from corroding and building up corrosion in the way in which they would with a metal-to-metal seal.

A method of making the gasket material for embodiments of the invention involves bonding the dielectric lining material to both sides of the metal substrate in large sheets to assure uniformity of the lamination. According to such a method, a water jet is thereafter utilized to cut appropriately dimensioned I.D and O.D. circles for gaskets out of the large sheets, and the locking elements are formed on the inner diameter circle of the cut-out circular gasket material, for example, with the circular gasket material mounted on a lathe. The resulting isolation gasket for embodiments of the invention has the stability and/or rigidity of a metal gasket with a stainless steel core having excellent corrosion resistance properties, while the glass reinforced epoxy laminated to the opposing surfaces of the gasket provides excellent insulating properties, and the locking elements provide that an inner diameter seal may be interlocked thereto. Grooves may be cut into the circular gasket material using a lathe, as well, in embodiments that use grooves for secondary sealing elements.

The previous description of the disclosed embodiments is provided to enable a person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A gasket for use between joined pieces in a flow line that is operative to contain fluid therein, comprising:
   (A) a retaining ring having opposing side surfaces separated by a first axial height and an inner diameter opening formed therein, the inner diameter opening comprising a first shape:
   (B) a clamp, the clamp having an outer clamp surface having a portion with a second shape to operatively engage the first shape such that the clamp engages the retaining ring, wherein the clamp has an inner clamp opening opposite the outer clamp surface, the clamp having a second axial height; and
   (C) an inner diameter seal element having a third axial height is formed of a non-conductive material and has an inner seal surface and an opposed outer seal surface comprising at least an annular protrusion shaped to extend into the inner clamp opening configured such that the inner clamp opening engages the annular protrusion when compressive force is applied to the clamp, wherein the cooperative engagement of the inner clamp opening and the annular protrusion inhibits radial movement of the inner diameter seal element.

2. The gasket of claim 1 wherein the retainer is formed from metal.

3. The gasket of claim 2 wherein the retainer has a dielectric material on the opposing side surfaces.

4. The gasket of claim 1 wherein the clamp is formed from metal.

5. The gasket of claim 4 wherein the clamp has a dielectric material on the outer clamp surface.

6. The gasket of claim 4 wherein the retainer is formed from metal and a dielectric material on the opposing side surfaces.

7. The gasket of claim 1 wherein the first axial height is less than the second axial height.

8. The gasket of claim 1 wherein the second axial height is less than the third axial height.

9. The gasket of claim 8 wherein the first axial height is less than the second axial height.

10. The gasket of claim 1 wherein the first shape is concave and the second shape is convex.

11. The gasket of claim 1 wherein the clamp is a C clamp.

12. The gasket of claim 11 wherein the C clamp is formed by a pair of seal arms extending from the portion of the outer clamp surface to the inner clamp opening, wherein the pair of seal arms have an apex.

13. The gasket of claim 1 wherein the inner diameter seal element has a chevron shape.

14. The gasket of claim 1 wherein the annular protrusion has a block shape.

15. The gasket of claim 1 wherein the inner diameter seal element has an outer diameter and the clamp has an inner diameter such that the outer diameter of the inner diameter seal element is larger than the inner diameter of the clamp and the inner diameter seal element expands into the clamp through the clamp opening.

16. The gasket of claim 12, wherein the seal arms of the C clamp form a secondary seal.

17. The gasket of claim 1, wherein the annular protrusion has opposed axially extending ridges.

18. A gasket, comprising:

an inner seal element having an outer seal surface with a radially extending protrusion extending therefrom, a C clamp having a pair of opposed sealing arms extending from an outer diameter clamp surface having a first shape to a C clamp inner diameter opening sized to receive the at least one radially extending protrusion and configured to contact the radially extending protrusion when a compressive force is applied at an apex, the pair of opposed sealing arms having opposed sealing surfaces at the apex; and a retaining ring having opposing side surfaces having an inner diameter opening with a second shape configured to operatively engage the first shape, wherein the cooperative engagement of the C clamp and the inner seal element inhibits radial movement between the retaining ring and the inner diameter seal element.

19. The gasket of claim 18 wherein the inner seal element is a non-conductive element.

20. The gasket of claim 18 wherein the retaining ring is metal and has a dielectric material on the opposed side surfaces.

\* \* \* \* \*